Figure 1:
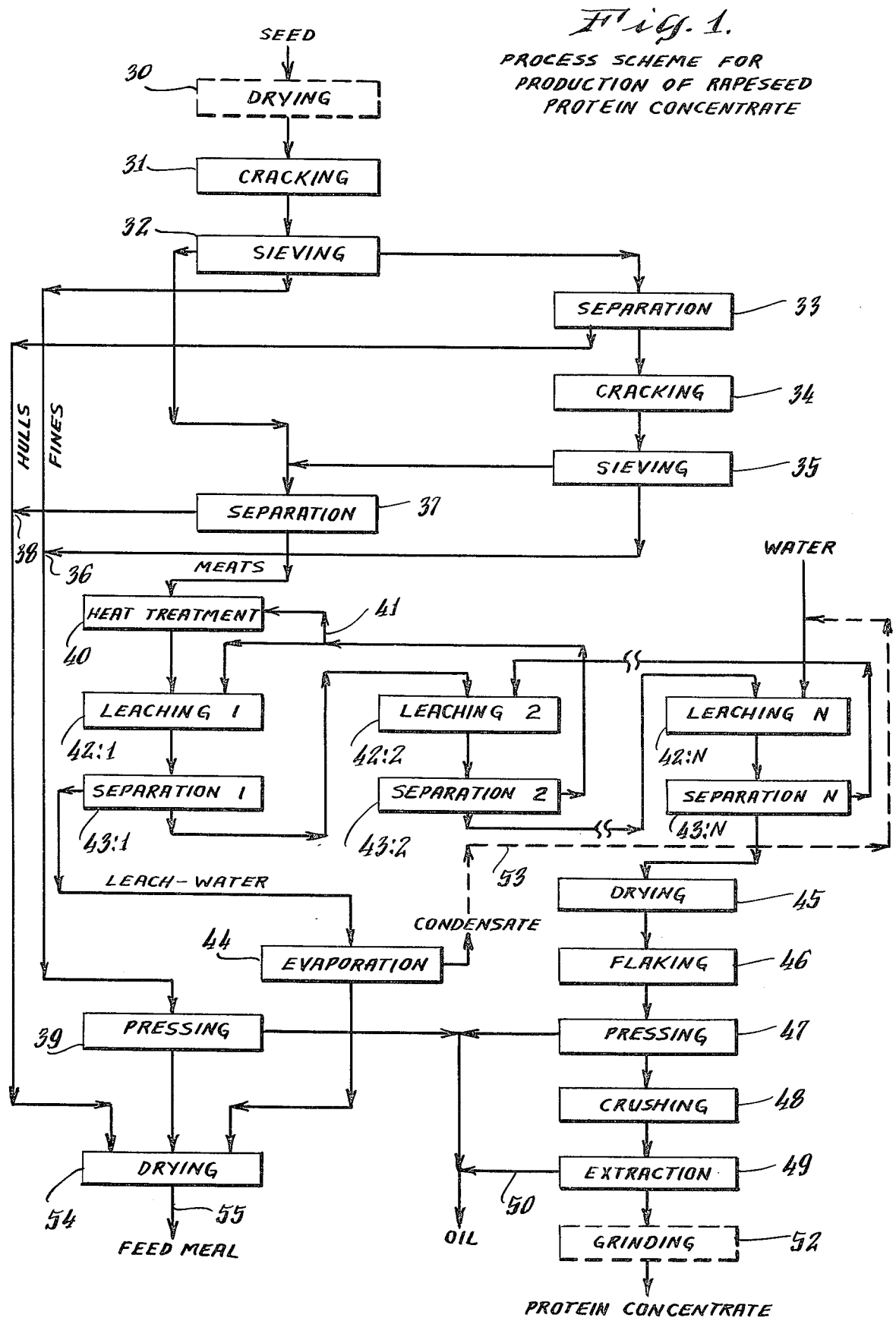

United States Patent [19]

Anjou et al.

[11] 4,083,836
[45] Apr. 11, 1978

[54] PRODUCTION OF RAPESEED PROTEIN CONCENTRATE FOR HUMAN CONSUMPTION

[75] Inventors: Klas Orvar Stensson Anjou, Karlshamn; Aurel Jeny Fecske, Grodinge; Carl Goran Krook, Stockholm; Jan Sven Ragnar Ohlson, Karlshamn, all of Sweden

[73] Assignees: Alfa-Laval AB, Tumba; AB Karlshamns Oljefabriker, Karlshamn, both of Sweden

[21] Appl. No.: 702,454

[22] Filed: Jul. 6, 1976

Related U.S. Application Data

[63] Continuation-in-part of Ser. No. 471,164, May 17, 1974, abandoned.

[51] Int. Cl.² .......................... A23J 1/12; A23J 1/14
[52] U.S. Cl. .................... 260/123.5; 426/417
[58] Field of Search ............... 426/425, 430, 431, 481, 426/518, 482, 483, 432, 443, 456, 465, 417; 260/412.2, 412.4, 210, 123.5; 99/261, 625; 209/162, 172, 173

[56] References Cited

U.S. PATENT DOCUMENTS

| 807,990 | 12/1905 | Ball | 426/483 |
|---|---|---|---|
| 2,712,698 | 7/1955 | Webb | 426/472 X |
| 2,808,056 | 10/1957 | Scheel et al. | 99/625 X |
| 3,007,797 | 11/1961 | Tiktak et al. | 426/432 |
| 3,057,739 | 10/1962 | Forkner | 426/465 X |
| 3,173,792 | 3/1965 | Mustakas et al. | 426/430 X |
| 3,481,743 | 12/1969 | King | 426/465 X |
| 3,615,657 | 10/1971 | Gastrock | 426/472 X |
| 3,732,108 | 5/1973 | Eapen et al. | 426/430 |

FOREIGN PATENT DOCUMENTS

| 1,043,742 | 6/1953 | France | 99/261 |
|---|---|---|---|
| 121,586 | 5/1919 | United Kingdom | 426/431 |

OTHER PUBLICATIONS

"Prepress–Solvent Extraction of Crambe: First Commercial Trial Run of New Oilseed", JAOCS, 10/65, vol. 42, No. 10.
Perry's Chemical Engineers' Handbook, 4th Edition, edited by R. H. Perry et al., published by McGraw Hill Book Co., 1963, pp. 19-86–19-87 and 21-54.

*Primary Examiner*—Frank Sever
*Attorney, Agent, or Firm*—Cyrus S. Hapgood

[57] ABSTRACT

To prepare a satisfactory edible protein concentrate, seed selected from *Brassica* species and *Crambe abyssinica* are cracked to loosen the hulls and then separated into a meat fraction and a hull fraction. The hull-free meat fraction is then subjected to myrosinase inactivation in the wet state at 80°–100° C, leaching by water of glucosinolates and other soluble components, drying, solvent extraction to remove the oil, and careful desolventizing so that the protein will not be damaged or discolored.

16 Claims, 3 Drawing Figures

PRODUCTION OF RAPESEED PROTEIN CONCENTRATE FOR HUMAN CONSUMPTION

This application is a continuation-in-part of our co-pending application Ser. No. 471,164 filed May 17, 1974, now abandoned.

This invention relates to a method for producing, from seeds from *Brassica*-species, a protein concentrate which is non-toxic, has an acceptable light color, a neutral and mild flavor, and a high nutritional value and which thus is well suited for human consumption. Seeds from crambe (*Crambe abyssinica*) can also be used according to the process.

*Brassica*-species of different kinds, such as rapeseed (*Brassica napus*), turnip rapeseed (*Brassica campestris*), white mustard (*Brassica hirta* or *Sinapis alba*), black mustard (*Brassica nigra*), brown or oriental mustard (*Brassica juncea*), are cultivated in the temperate zones around the world, mainly as oilseed crops because of the relatively high oil content of the seeds.

The residue after the oil extraction (the so-called press cake, or if the oil has been extracted with solvent, the so-called meal) has had only a limited use as feed on account of its content of glucosinolates, which can be split into deleterious compounds with pungent flavor. In some parts of the world, the residue has not been used at all in other ways than to plow it down as a fertilizer.

The protein in the *Brassica*-seeds has shown an extraordinarily high nutritional value, with a better amino acid balance than, for instance, the corresponding protein from soybeans, as can be seen from Table 1.

Table 1

Content of different amino acids in hull-free rapeseed meal and hull-free soybean meal g/16gN

| Essential amino acids | Rapeseed meal | Soybean meal |
|---|---|---|
| isoleucine | 4.4 | 4.2 |
| leucine | 7.6 | 7.0 |
| lysine | 6.7 | 5.8 |
| phenylalanine | 4.2 | 4.5 |
| tyrosine | 2.9 | 3.1 |
| cystine | 1.2 | 0.7 |
| methionine | 2.0 | 1.1 |
| treonine | 4.6 | 4.3 |
| valine | 5.3 | 4.3 |
| tryptophan | 1.4 | 1.2 |
| histidine | 3.2 | 2.4 |
| arginine | 6.8 | 7.0 |
| aspartic acid | 7.2 | 10.2 |
| glutamic acid | 19.2 | 16.5 |
| serine | 5.0 | 5.0 |
| proline | 6.8 | 4.8 |
| glycine | 5.4 | 3.8 |
| alanine | 4.8 | 3.9 |

As can be seen, the contents of the especially important amino acids cystine, methionine, and lysine are higher in rapeseed meal than in soybean meal.

The glucosinolates existing in the *Brassica*-seeds are per se not toxic, but after cracking of the seeds they are split under influence of moisture by enzymes (myrosinases) present in the seeds.

The myrosinases can be inactivated through a rapid heating in the dry or wet state, and in the presence of moisture this heating must proceed so quickly that the myrosinases do not have time to split the existing glucosinolates to any great extent. However, since myrosinases are also present in other products, such as cabbage, a product from *Brassica*-plants which is only myrosinase inactivated is not suitable as food or feed, because a great danger always exists that myrosinases are brought through other parts of the food or feed, or through formation of myrosinases by intenstinal bacteria, with subsequent splitting in the intestine and development of the deleterious substances there.

Consequently, the glucosinolates must also be removed from the material before this is suitable for food uses.

In the traditional treatment of *Brassica*-seeds, which primarily aims at extraction of the oil, the pre-dried (8% moisture) seed is crushed in a roller mill, after which the crushed material is heat treated in cookers with regulated moisture conditions. This treatment is intended, among other things, to inactivate different enzymes in a careful manner and by that to protect primarily the oil, as the glucosinolates per se are not oil soluble, contrary to the split products. If these sulphur-containing split products are dissolved in the oil, they may cause catalyst poisoning if the oil is later hydrogenated.

The seed material thereafter is usually subjected to a pressing process in expeller presses, where the main part of the oil is extracted; and after a repeated crushing or flaking, the rest of the oil is solvent extracted, usually with light petroleum (hexane). The remaining meal is then subjected to an intense heat treatment (called toasting) in order to remove all solvent residues. In this treatment, the color of the meal is darkened and at the same time the protein value is markedly lowered.

The meal thus produced is certainly free from myrosinase; but for the reasons described above, it can be used only in limited amounts for feeding on account of the danger of splitting in the intestine.

Attempts to remove the deleterious sulphur compounds or their precursors from the meal have not failed. Thus, before 1900 Sjollema (Landwirtschaft. Versuchsstat. 1900, p. 311–9) found that the myrosinases could be inactivated through wet treatment with water at 72° C, or through dry heat treatment at 100°–105° C; but the material he used was only pressed and still contained a comparatively large amount of oil.

Mere inactivation of the myrosinases, however, is not enough, as has been pointed out above, but also the per se undetrimental glucosinolates must be removed. Thus, Astwood et al. (J. Biol. Chem. 181, 121–9 [1949]) reported in 1949 from Canada that the compound in the rapeseed, which gave rise to the detrimental L-5-vinyl-2-oxazolidinethione, could be extracted with cold water.

Allen & Dow (Sci. Agr. 32, 403–10 [1952]) found, however, that this method was not effective but detected that a several-times repeated extraction with hot (98°–99° C) water effectively removed the goitrogenic substance. Contemporary trials in Sweden, performed in cooperation with AB Karlshamns Oljefabriker, by Frolich (Statens Husdjursforsok, sart. och medd. nr 92; Kungl. Lantbrukshogskolan Annaler 19, 205–7 [1952], Ibid. 20, 105–16 [1953]), both with 70% ethanol and with cold water showed:

1. That the rapeseed meal (processed and heat treated as above) did not contain any myrosinase.
2. That extraction with cold water effectively removes the isothiocyanates and to some extent the oxazolidinethione too.
3. That 70% ethanol has mainly the same effect.

However, the material cannot be used for human consumption because, apart from the fact that the detoxification will not be effective enough to make it acceptable for human food purposes, it has a dark color resulting from the heat treatment, probably caused by Maillard reactions, and also it contains all the hulls and fibrous matter.

Therefore, it is necessary to introduce a quite new procesing of the dried and cleaned seed to be able to:
1. Obtain a nontoxic, bland tasting and lightly colored protein concentrate, and at the same time to
2. Obtain an oil with at least the same quality as obtained by conventional processing and preferably still better.

The main product obtained by conventional processing, the oil, is a high-class edible oil with good keeping properties and low oxidation values. However, it has sometimes appeared slightly inferior under the conditions of hydrogenation than other comparable vegetable oils, as it can show a tendency to cause catalyst poisoning. This is supposed to result from the fact that micro amounts of sulphur compounds are dissolved during the oil extraction, despite the fact that the glucosinolates are unsoluble in both oil and hexane.

Certain works by scientists, who have been trying to solve these problems, have been published. Thus, Eapen, Tape & Sims (J. Am. Oil Chem. Soc. 45 (1968) 194–6) proposed a process including a wet heat treatment of the whole seeds through immersion in boiling water (in bags of filter cloth) in order to inactivate the myrosinases and at the same time loosen the fibrous hull from the seed meat. The seeds are then wet-ground in a vertical plate grinder so that the seed meat is squeezed out, whereupon the whole material is extracted with water several times and is dried. Hulls and meat material are separated by air cLassification. The fractions are then solvent extracted with hexane for recovery of the oil.

The latter process will certainly give an oil of good quality, comparable to or superior to an oil produced according to conventional methods; but it is not economically feasible as the above mentioned authors have demonstrated in a second article (J. Am. Oil Chem. Soc. 46 (1969) 52–5). The process actually brings about large material losses in the water extraction, and large amounts of water are used for the extraction, which causes problems with the disposal of the spent process water. The difficulties in air classifying the material into a feed meal fraction with lower protein content, which is rich in hulls, and a flour fraction for edible uses with higher protein content and less hulls, will result in a low yield of the latter end product.

It is an object of the present invention to provide a process for producing a protein concentrate from either *Brassica*-seeds or crambe seeds, with higher yields and improved quality of the protein concentrate.

It is a further object of the present invention to provide a process for an effective leaching out of the glucosinolates in the material, with a minimized amount of water, whereby the process can be made economically justifiable, and at the same time an oil of high quality will be recovered.

It is a further object of the present invention to provide a process for producing a practically hull-free concentrate with light color and bland flavor.

These and other objects and advantages of the invention have been achieved through a process for the production of a protein concentrate from *Brassica*-seeds, as well as crambe seeds, which comprises the steps of cracking the dry seeds so that the hulls are loosened, separating the material into a meat fraction and a hull fraction, inactivating the myrosinases in the meat material by wet heat treatment at 80°–100° C, leaching out glucosinolates, and other soluble matter (mainly carbohydrates) in the meat material with water, drying the material, solvent extracting the oil from the material (ordinarily after pre-pressing in order to first extract the main part of the oil), desolventizing carefully so that the protein will not be damaged or discolored, and, if necessary, grinding.

For an understanding of the invention,, it is important to know what is meant by the term "hull". As used herein, "hull" denotes the seed coat is surrounding contact with the meat material and is to be distinguished from the pod which contains the seed. In the case of rapeseed (*Brassica*-species), each pod contains a substantial number of the seeds; and in the threshing of rapeseed, the pod releases its seeds with their hulls (coats) still in surrounding contact with the meat material. In the case of crambe seed, the pod, which is sometimes referred to as the pericarp, contains only one seed; and the pod can be removed without damaging the seed, leaving the latter with its hull (coat) intact and still in surrounding contact with the meat material.

Despite the very small seed size (weight of 1,000 *Brassica*-seeds is 2.0–5.5 g), the special cracking process according to the invention surprisingly enables cracking of the seeds in such a manner that the hulls are loosened so that thereafter, with the aid of the separation process used according to the invention, seed material and hull material may be separated in an effective manner.

By separating the hulls at the beginning of the process, several advantages are achieved. For example, only meat material is treated further in the process, and there is no need to treat the hulls, which reduces the amount to be treated by 15–20%. Also, in addition to the advantage of needing a lesser amount of leach-liquid, this means an increase in the capacity of the plant so that a larger amount of seed can be processed in a given size of equipment. Moreover, no sanitary problems will appear in the cracking equipment, as no growing of microorganisms can take place in the dry material. It has also been revealed that a cleaner meat material will be obtained by the separation, and a considerably smaller loss of meat material with the hulls, than by previously described crushing and separation processes.

Further, it has been demonstrated that when the dehulling is performed in this early stage, a larger capacity of the separating equipment is obtained than when attempting to separate leached material. The process also involves the advantage that smaller losses of too finely divided material (fines) occur than by wet grinding in a vertical plate grinder, as in earlier processes. Moreover, for the myrosinase inactivation, a part stream of the leach-liquid that is used in the counter current process is used, which will mean a further saving of process water.

Figure 2:
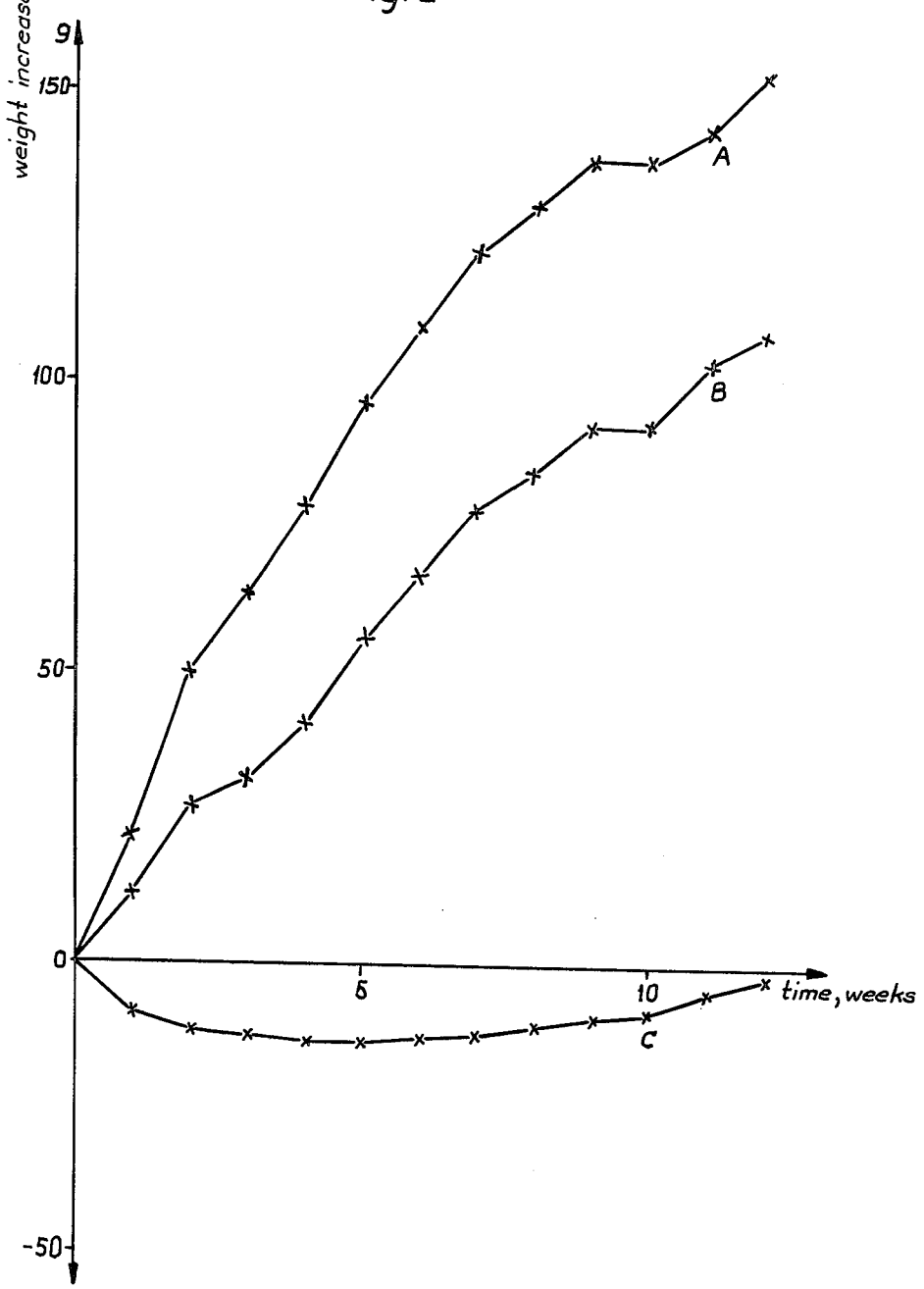
Figure 3:
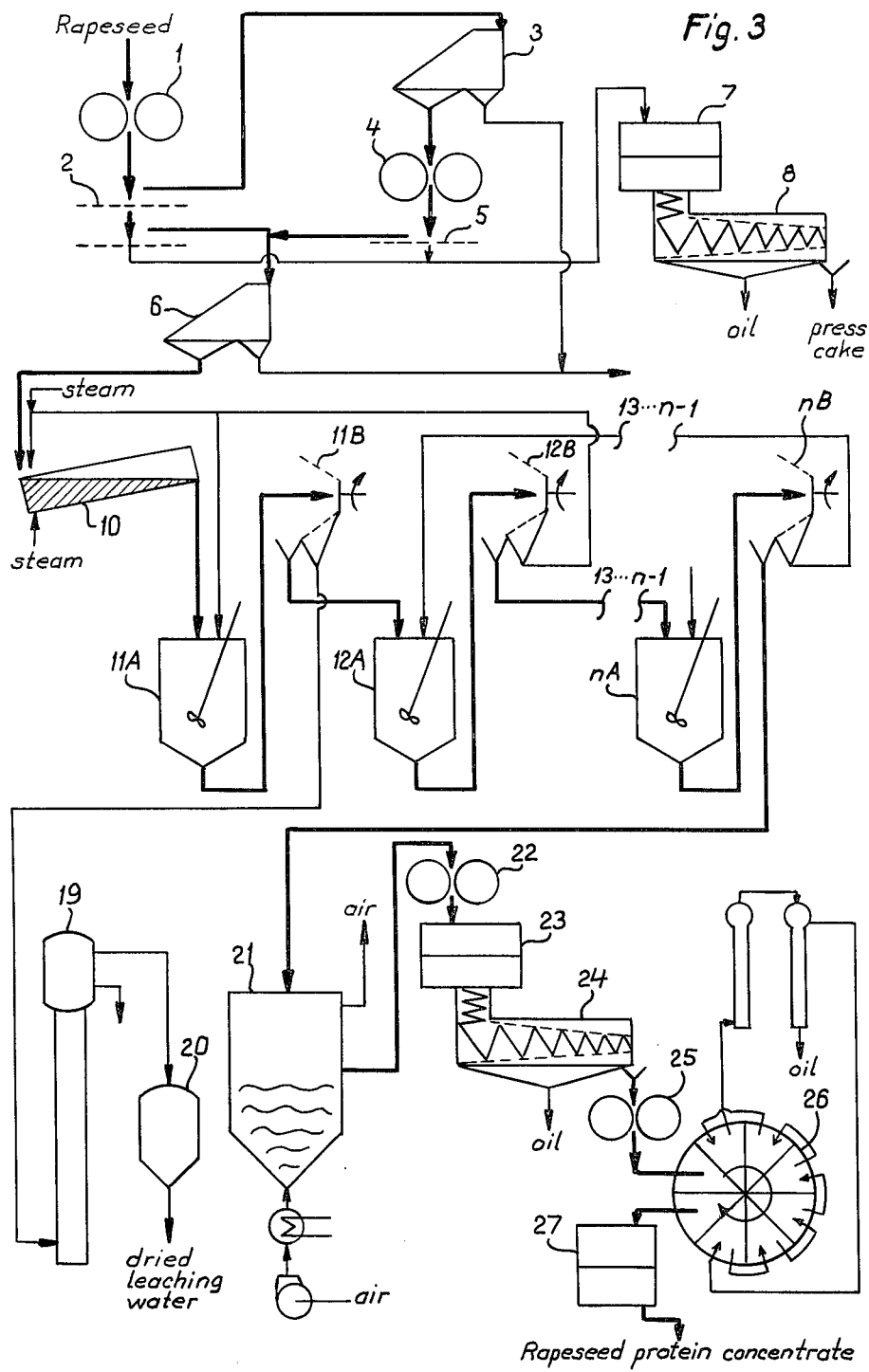

The invention will now be described with reference to the accompanying drawings in which FIG. 1 is a flow diagram of one form of the new method;

FIG. 2 is a chart showing comparative weight developments for rats fed on different materials and FIG. 3 is a schematic view of a system for carrying out the new method.

Referring to FIG. 1, the starting material is rapeseed (*Brassica napus* or *Brassica campestris*) which has been removed from the pods and cleaned and then dried at 30. The seeds are cracked at 31 in a roller mill with fluted rolls, which are driven at different variable speeds whereby the hulls are loosened from the meats. The material is then sieved in a sifter 32 equipped with two screens with aperture sizes of 1–2 mm and 0.3–0.8 mm, respectively, so that three fractions are obtained, namely, a coarse fraction, a medium fraction and a fine fraction (fines). The coarse fraction is separated at 33 into hulls and incompletely dehulled meats on a gravity table. These meats are further cracked at 34 and sieved at 35 (screen with aperture size of 0.3–0.8 mm). The fines from this operation are mixed at 36 with those from the first sieving 32. The medium fractions are brought to another gravity table where hulls and meats are separated at 37. The hull fractions are combined at 38.

In this way it is possible to achieve a yield of 75–77% meats, 7–12% of fines, and 13–16% of hull fraction. The mixed fractions of fines from 36 are pressed at 39 in an expeller press, whereby about 90% of the oil is recovered.

The meat fractions mixed together are heat treated at 40 in order to inactivate the myrosinases and to lower the solubility of the proteins by protein denaturation. Also, a reduction of naturally present microorganisms in the seed material occurs through the heat treatment. This is performed in a leaning screw conveyer, which is steam jacketed. The meat material is fed into the lower part, where it immediately is mixed with hot (90°–115° C) leach-water fed at 41 from the second stage in the process. The meat material is treated under an average holding time of 3–10 minutes.

The leaching is done in 2–8 stages in tanks (equipped with stirrers) with water by a counter-current process. If needed, more stages can be used. Between each leaching stage 42:1–42:n there is a separating sieve 43:1–43:n. This is designed as a horizontal rotating cone, and the material-water slurry is fed into the center. By the centrifugal force, the solid material is forced to slip on the sieving cloth toward the periphery at the same time as the liquid is passing through the sieving cloth.

The heat inactivated material from 40 is brought to the first leaching stage 42:1, where it is mixed with leach-liquid from the separating sieve 43:2.

After this first leaching the material-water slurry is pumped to the corresponding separating sieve 43:1, from which the spent leach water is pumped to the evaporation step 44.

The solid rapeseed meat material from 43:1 then falls down into the second leaching stage 42:2, where it is mixed with leach water from the next separating sieve 43:3, and so on.

In the last leaching stage 42:n the solid material is mixed with pure water.

The amount of water used in the leaching is 3–10 times the amount of meats, and the average holding time in each stage is 15–90 minutes. The temperature in the leaching is normally 60°–80° C. At this temperature a stronger leaching effect is obtained, and at the same time the growing of any microorganisms is effectively prevented. Alternatively, a temperature of 10°–30° C (i.e., ambient temperature) can be used, but this entails the risk of bacterial growth. The pH of the leach-water is normally about 5.5–6 when nothing has been added to the water. The leaching can also be done at lower pH by adding an acid, which also will retard eventual bacterial growth.

The loss of dry material of the meats in the leaching is about 17–22%. The loss of oil in the leaching is about 4–9% of the oil content in the meats. The loss of protein is about 16–20% of the protein in the meats. The glucosinolate content of the meats is lowered in the leaching from about 3–3.7% to less than 0.1% in the leached meats.

After the last separation 43:n, the leached meats are dried at 45 in a fluidized-bed dryer. The temperature of the discharging air is about 50°–70° C. The feed material has a moisture content of 45–55% and it is dried to 3–7%.

The dry meat material is lightly flaked at 46 in a roller mill and is then pressed at 47 in an expeller press. So much oil is pressed out that the oil content is lowered from about 60% to 15–20%. Fines that have followed the oil are recovered through sedimentation and filtering and are returned to the press.

The press residues are then crushed at 48 and extracted at 49 with hexane in a normal oil extraction plant, from which rapeseed oil is obtained at 50 and rapeseed protein concentrate at 51. The desolventizing of the rapeseed protein concentrate is done with superheated solvent vapor in a flash desolventizer or in a vapor desolventizer, so that any destroying of the protein or any dark coloring do not occur. Finally, the rapeseed protein concentrate is ground at 52 in a mill. The grinding, however, is not necessary.

The fines from the dehulling section of the process contain about 40–50% oil. This is extracted in the separate expeller press at 39, resulting in a fat content of 7–10% in the fines.

The oils from the different pressings and from the solvent extraction are mixed together.

The leach-water, which contains 2–9% dry matter including the glucosinolates, is evaporated at 44 to a dry matter content of 25–60 %. The evaporated water is condensed and can then be conducted at 53 for use again as pure water in the least leaching stage 42:n. The moisture content of the leach-water concentrate is then lowered to about 10% in a dryer, 54.

The drying can alternatively be done at 54 on a combined material consisting of the leach-water concentrate from evaporator 44, the hull fractions from junction 38, and the pressed fractions of fines from press 39 or either of these. If all fractions are combined, a feed meal is obtained at 55 with a protein content of about 20–25% and a fat content of about 10–15%.

The rapeseed protein concentrate thus produced has a protein content of about 64–67% of the dry matter, a fat content of about 0.5–1% and a glucosinolate content of <0.1%. The product is free from flavor and odor and has a light yellowish color.

Animal tests, carried out with rapeseed protein concentrate produced according to the process, have demonstrated that this concentrate has an extraordinarily high nutritional value. Thus, the rapeseed protein concentrate (RPC) has a PER-value (Protein Efficiency Ratio) of 2.8–3.0 compared with the figure of 2.5 for casein and a NPU-value (Net Protein Utilization) of 77–79, which depends partly on the ideal amino acid composition and partly on the fact that the glucosinolates are removed so effectively in the process.

In toxicological tests on rats, no pathological changes at all have been observed on test animals which were fed with RPC as the only source of protein for 3 months.

The weight increase of rats fed RPC and casein, respectively, is shown in FIG. 2, where the effect of the detoxification is also demonstrated. In FIG. 2, curves A and B show the weight developments for rats fed on RPC and casein, respectively, and curve C is a similar showing for rats fed on a defatted but not detoxified rapeseed meal.

EXAMPLE 1

In a pilot plane built for a raw material flow of about 150 kg/h (3.6 ton/day), seed from *Brassica napus* of Swedish origin. (winter rapeseed) was proceeded continuously. In this processing, as shown in FIG. 3, the seed (150 kg/h) was cracked in a roller mill 1 with a fluted rolls and with a distance between the rolls of 0.9 mm. The rolls were rotated at 350 and 500 r.p.m. respectively. The cracked material was then sieved on a vibration sifter 2 in two stages. The coarse fraction left on the coarsest screen was fed to a gravity table 3 where it was separated into a hull fraction and an "impure" meat fraction (containing material not sufficiently cracked). This meat fraction was cracked one more time in a roller mill 4 with a distance between the rolls of 0.65 mm. The rolls were rotated at 200 and 500 r.p.m. respectively. This re-cracked material was sieved on a single vibration sifter 5. The coarse fraction from this sifter was sifter to the medium fraction from shifter 2. This medium fraction was transported to a gravity table 6, where the loosened hull material was removed. The clean meat material (comprising 77.1% of the originally fed seed amount) was conveyed from table 6 to the inactivation stage 10.

The fractions of fines from sifter 2 and sifter 5 were heated in a cooker 7, and the oil in the material was extracted (by pressing) in the expeller press 8. The press residue, which comprised 4.4% of the originally fed seed amount had a residue fat content of 7.5%.

|  | % of Original Seed |
|---|---|
| Hull fraction from gravity table 3 | 11.4 kg/h = 7.6% |
| Hull fraction from gravity table 6 | 12.3 kg/h = 8.2% |
| Sum of removed hull material | 23.7 kg/h = 15.8% |
| Fine fraction from sifter 2 | 3.2 kg/h = 2.1% |
| Fine fraction from sifter 5 | 7.4 kg/h = 4.9% |
| Sum of fractions of fines | 10.6 kg/h = 7.1% |
| Extracted oil from the fine fractions | 4.0 kg/h = 2.7% |
| Press residue | 6.6 kg/h = 4.4% |
| Clean meats from the gravity table 6 | 115.7 kg/h = 77.1% |

The inactivation stage 10 consisted of a jacketed vessel equipped with a screw conveyer. In the inlet, the meats were immediately mixed with leach-water from the second stage of the leaching (12B in FIG. 3). This leach-water had first been heated with live steam to 110°–115° C. The vessel was heated with hot water at a temperature of 110°–115° C in the jacket. A small amount of live steam was also blown into the lower part of the vessel. At least so much leach-water was added as was required to completely wet the material and also maintain a liquid level in the vessel. The temperature of the material at the inactivation was 95°–100° C. After an average holding time of 6 minutes, the material left the vessel and fell down into the tank of the first leaching stage (11A).

The heat-treated meat material was then continuously leached counter-currently with water in five stages 11–15 ($n = 15$ in FIG. 3). Each stage consisted of a leaching tank (11A – 15A) followed by a centrifugal sieve (11B – 15B). The material was leached on an average of 1 hour in each tank, i.e., totally 5 hours, after which the leach-liquid was sieved away in the subsequent centrifugal sieve and the material was transferred to the next stage. Fresh water in an amount of 3 times the entering meat material (i.e., about 350 l/h) was added into the last leaching tank 15A, and this water was then used according to the counter-current principle in the foregoing leaching stages.

The leaching was performed at an average temperature of 65° C. No growth of microorganisms took place during the leaching at this temperature. After the fist leaching stage (11A, 11B), the spent leach-liquid was first pumped to the evaporator 19, where the liquid was evaporated to a dry matter content of 47.5%, and then to the dryer 20, where the material was dried to a moisture content of 9.7%.

The material leached with water in the last stage 15A was freed from liquid in the centrifugal sieve 15B and then conveyed to a fluidized-bed dryer 21 where the material was dried with hot air at 60° C, so that an average dry matter content of 95.5% was obtained.

The glucosinolate content of the leached and dried material was 0.02% of the dry matter, i.e., 0.4% of the original amount in the seed (0.5% of the original amount in the meat material).

After drying of the inactivated and leached material, 77.8% of the meat material remained, i.e., a yield of 90.0 kg/h was attained.

The dried material was lightly flaked in a roller mill 22 and then continuously conveyed to an expeller press 24 equipped with a cooker 23. The material was there heated to a temperature of 65°–70° C before it was conveyed into the press 24.

The press residue from press 24 contained 17.4% oil. This means that about 85% of the oil was pressed out in this stage. The quality of the pressed oil was very good, with a peroxide value of 0.6 mekv/g. The press cake was then crushed into smaller parts in the cursher 25 and was extracted with hexane (Light petroleum 63/80S, distillation interval 64°–70° C) in the extractor 26, in which the oil content of the concentrate was reduced to 1.0%. The solvent residues were removed in a modified desolventizer-toaster 27 in two stages at a temperature of 60°–64° C and 90°–100° C, respectively, with the aid of steam and nitrogen gas. The modifying of the desolventizer-toaster meant that the toasting effect was eliminated. In order to obtain a homogen; product, the concentrate was then ground. The product was lightly yellowish and had a bland flavor and was free of odor.

The concentrate had a protein content of 66.8% of the dry matter (moisture content 8%). The fiber content was only 6.9% and the ash content was 6.9%. Yields and other analyses data are given in Table 2.

Table 2
Material Balance and Analysis Data for Example 1

| Material | Yield kg/h | Moisture % | Oil | Protein | Fiber | Glucosinolate |
|---|---|---|---|---|---|---|
| | | | Weight - % of Dry Matter | | | |
| Seed | 150 | 6.0 | 45.5 | 24.6 | 7.5 | 3.3 |
| CRUSHING DEHULLING → hulls | 23.7 | 10.7 | 10.5 | 17.7 | 33.4 | 1.0 |
| fine fraction | 10.7 | 5.5 | 44.0 | 25.0 | 7.7 | 3.0 |
| PRESSING → oil | 4.1 | — | 100 | — | — | — |
| press residue | 6.6 | 9.1 | 8.3 | 42.5 | 12.6 | 5.0 |
| clean meat material | 115.7 | 5.0 | 52.3 | 25.8 | 2.5 | 3.7 |
| INACTIVATION LEACHING DRYING → leach-water | 283.5 | 91.6 | | | | |
| EVAPORATION DRYING | | | | | | |
| dry matter from leach-water | 26.4 | 9.7 | 21.4 | 23.9 | 0.6 | 17.2 |
| leached meat material | 90.0 | 4.5 | 60.9 | 26.4 | 3.0 | 0.02 |
| PRESSING HEXANE EXTRACTION → oil | 52.1 | — | 100 | — | — | — |
| concentrate | 36.9 | 8.0 | 1.0 | 66.8 | 7.5 | 0.06 |

EXAMPLE 2

The procedure in Example 1 was repeated but with a simplified dehulling process, where gravity table 3, roller mill 4 and sifter 5 were not used (FIG. 3). Swedish rapeseed (winter type) was fed continuously into the plant at a rate of 125 kg/h.

The seed was cracked in the roller mill 1. The fluted rolls were adjusted to a spacing of 0.75 mm and were rotated at 350 and 500 r.p.m., respectively. The cracked material was sieved on the sifter 2 equipped with screens, as in Example 1. The coarse fraction (remaining on the top screen) was returned to the roller mill for repeated cracking together with the feed material.

The medium fraction (remaining on the bottom screen) was transported to the gravity table 6 where it was divided into a hull fraction and a mainly clean meat fraction. The fines were pressed as in example 1 in order to extract the main part of the oil. The clean meat material was transported to the inactivation stage 10 and was after that treated as in Example 1. Yields and analysis data are given in Table 3.

Table 3
Material Balance and Analysis Data for Example 2

| Material | Yield kg/h | Moisture % | Oil | Protein | Fiber | Glucosinolate |
|---|---|---|---|---|---|---|
| | | | Weight - % of Dry Matter | | | |
| Seed | 125 | 6.0 | 45.5 | 24.6 | 7.5 | 3.3 |

Table 3-continued

Material Balance and Analysis Data for Example 2

| Material | Yield kg/h | Moisture % | Oil | Protein | Fiber | Glucosinolate |
|---|---|---|---|---|---|---|
| | | | Weight - % of Dry Matter | | | |
| CRUSHING DEHULLING → hulls | 16.9 | 11.8 | 9.3 | 16.5 | 38.0 | 0.9 |
| fine fraction | 13.6 | 5.5 | 41.0 | 25.2 | 6.9 | 3.0 |
| PRESSING → oil | 4.5 | — | 100 | — | — | — |
| press residue | 9.1 | 8.2 | 9.0 | 38.8 | 10.5 | 4.6 |
| clean meat material | 94.5 | 5.0 | 52.2 | 25.7 | 2.5 | 3.7 |
| INACTIVATION LEACHING DRYING → leach-water | 231.5 | 91.6 | | | | |
| EVAPORATION DRYING | | | | | | |
| dry matter from leach-water | 21.5 | 9.9 | 21.2 | 23.9 | | 17.1 |
| leached meat material | 73.6 | 4.5 | 60.7 | 26.3 | 3.0 | 0.02 |
| PRESSING HEXANE EXTRACTION → oil | 42.6 | — | 100 | — | — | — |
| concentrate | 30.3 | 8.0 | 1.0 | 66.3 | 7.9 | 0.06 |

A comparison with Example 1 shows that the yield was somewhat lower. The capacity of the equipment was also lowered a little, which to some extent was compensated by a simplified equipment and reduced energy consumption. The purity, however, was about the same, so this process may be seen as a compromise between yield and the invested equipment and capacity.

EXAMPLE 3

In order to illustrate the influence of the leaching temperature on the leaching efficiency, the plant was run as in Example 1, but the temperature in the tanks was lowered to ambient temperature.

It then turned out that if the glucosinolate content in the leached material is to be reduced to the same low value as in Example 1, the leaching must be done in 6 stages (11–16).

On the other hand, the low temperature resulted in a lowered loss of dry matter in the leach-water, so the yield increased to 25.9%. The concentrate had a protein content of 64.0%. Yields and analysis data are given in Table 4.

Table 4

Material Balance and Analysis Data for Example 3

| Material | Yield kg/h | Moisture % | Oil | Protein | Fiber | Glucosinolate |
|---|---|---|---|---|---|---|
| | | | Weight - % of Dry Matter | | | |
| Seed | 150 | 6.0 | 45.5 | 24.6 | 7.5 | 3.3 |
| CRUSHING DEHULLING → hulls | 23.7 | 10.7 | 10.5 | 17.7 | 33.4 | 1.0 |
| fine fraction | 10.7 | 5.5 | 44.0 | 25.0 | 7.7 | 3.0 |
| PRESSING → oil | 4.1 | — | 100 | — | — | — |
| press residue | 6.6 | 9.1 | 8.3 | 42.5 | 12.6 | 5.0 |

Table 4-continued
Material Balance and Analysis Data for Example 3

| Material | Yield kg/h | Moisture % | Oil | Protein | Fiber | Glucosinolate |
|---|---|---|---|---|---|---|
| | | | Weight - % of Dry Matter | | | |
| clean meat material | 115.7 | 5.0 | 52.3 | 25.8 | 2.5 | 3.7 |
| ↓ INACTIVATION LEACHING DRYING → leach-water | 289.7 | 93.3 | | | | |
| ↓ EVAPORATION DRYING ↓ dry matter from leach-water | 21.5 | 9.8 | 13.2 | 27.9 | | 21.2 |
| leached meat material | 94.7 | 4.5 | 60.7 | 25.4 | 2.9 | 0.02 |
| ↓ PRESSING HEXANE EXTRACTION → oil | 54.7 | — | 100 | — | — | — |
| ↓ concentrate | 38.9 | 8.0 | 0.9 | 64.0 | 7.3 | 0.04 |

Danger of microbiological growth exists to a higher degree at this temperature more favorable for microorganisms and because of the prolonged total leaching time, and this risk must be considered when choosing leaching temperature.

EXAMPLE 4

The process can also be carried out with a lower meat-to-water ratio, as 1:10, which is demonstrated by this example. Such a working method can be utilized when there is an abundant supply of cheap water and no resulting pollution problems.

The pilot plant was run as in Example 1, but the leaching was carried through in three stages, with a meat-to-water ratio of 1:10 and with water of ambient temperature.

The yields were about the same as in Example 3, and 26.2% of rapeseed protein concentrate was obtained. A low glucosinolate content of 0.06% of dry matter was achieved.

EXAMPLE 5

The pilot plant was run as in Example 1 up to the leaching stages. The leaching was carried out in four stages with hot (65° C) water, a meat-to-water ratio of 1:4, and a holding time of 1 hour per stage.

Samples were continuously taken after the third stage, and this material was further processed in a laboratory scale in order to find out the effect of a shortened process.

The protein concentrate obtained after the leaching in four stages with a yield of 25.3% has a glucosinolate content of 0.04%.

After three stages a glucosinolate content of 0.09% had been reached. It was calculated that about the same yield should have been obtained but with some tenth lower content of protein in the concentrate.

EXAMPLE 6

In order to demonstrate the effect of the holding time on the leaching result, the plant was run as in Example 1, with a meat-to-water ratio of 1:3 but with cold leaching, i.e., ambient temperature.

The leaching time per stage was varied between 1 hour, 40 minutes and 20 minutes.

The following values of the glucosinolate contents in the concentrates was obtained, as % of weight of dry matter:

| Number of Stages | Time, minutes | | |
|---|---|---|---|
| | 20 | 40 | 60 |
| 6 | | 0.07 | 0.04 |
| 7 | 0.05 | 0.03 | |

EXAMPLE 7

The effect of the inactivation time was studied in a separate test in which the time was varied between 1.5–20 minutes while the other parameters, such as temperature and amount of water, were kept constant.

Studies were carried out on material from the first leaching stage, as the largest losses arise here and thus determine the total losses.

The myrosinase activity and nitrogen solubility index (NSI) were determined in the material which left the inactivation stage, while losses of dry matter and protein were determined after the first leaching stage.

The following results were obtained:

| Time min. | Myrosinase activity % of original | NSI % | Dry matter loss % by weight | Protein loss % by weight |
|---|---|---|---|---|
| 1.5 | 2 | 17 | 19 | 17 |
| 3 | 0 | 13.5 | 17 | 15 |
| 6 | 0 | 11 | 15 | 12 |
| 10 | 0 | 9.5 | 13 | 11 |
| 20 | 0 | 8.5 | 12.5 | 10.5 |

EXAMPLE 8

The plant was run with a lot of summer turnip rapeseed (*Brassica campestris*). The cracking and the dehulling were carried out according to the simplified process as in Example 2. The tolls in the roller mill had been adjusted to a spacing of 0.6 mm and were rotated at 150 and 500 r.p.m. respectively.

After the inactivation stage 10, the clean meat material was treated as in Example 1. Yields and analyses data are given in Table 5.

-continued

| | |
|---|---|
| (dry matter from the leach-water) | |
| Extracted oil | 28.6% |
| (from pressing and solvent extraction) | |
| Protein concentrate | 31.2% |
| Protein content | 64.5% |
| Glucosinolate content | 0.06% |

Table 5
Material Balance and Analysis Data for Example 8

| Material | Yield kg/h | Moisture % | Oil | Protein | Fiber | Glucosinolate |
|---|---|---|---|---|---|---|
| | | | Weight - % of Dry Matter | | | |
| Seed | 150 | 5.9 | 42.8 | 24.9 | 8.1 | 2.8 |
| CRUSHING DEHULLING → Hull | 32.7 | 10.0 | 19.9 | 18.7 | 28.0 | 1.3 |
| fine fraction | 7.8 | 7.1 | 41.6 | 24.7 | 7.4 | 2.7 |
| PRESSING → oil | 2.6 | — | 100 | — | — | — |
| press residue | 5.3 | 11.3 | 9.6 | 38.7 | 12.9 | 4.2 |
| clean meat material | 109.5 | 4.5 | 49.0 | 26.5 | 2.7 | 3.2 |
| INACTIVATION LEACHING DRYING → leach-water | 276.5 | 91.5 | | | | |
| EVAPORATION DRYING → dry matter from leach-water | 26.1 | 9.8 | 19.8 | 22.3 | | 14.4 |
| leached meat material | 86.1 | 4.5 | 57.3 | 27.7 | 3.3 | 0.02 |
| PRESSING HEXANE EXTRACTION → oil | 46.8 | — | 100 | — | — | — |
| Concentrate | 38.6 | 8.0 | 0.9 | 64.4 | 7.5 | 0.05 |

As is evident from the material balance, a larger hull fraction was obtained than with winter rapeseed (*B. napus*); but in spite of this, the yield of concentrate was somewhat larger due to the lower oil content in the seeds.

EXAMPLE 9

Seed from Swedish white mustard (*Brassica hirta*, also called *Sinapis alba*) was run in the pilot plant according to the simplified dehulling process in Example 2. The dehulling appeared easy to carry out with a good yield because the fraction of fines was completely free from hulls, so it could be brought together with the meat material from the gravity table.

The process was then run according to Example 1 but with six leaching stages, as the glucosinolate content (5.9% of dry matter) in the mustard seed is considerably higher than in rapeseed. The following yields were obtained:

| | |
|---|---|
| Hull fraction | 20.8% |
| Meat fraction | 79.2% |
| Leaching loss | 20.1% |

EXAMPLE 10

Pilot plant trial runs were also performed with seeds of brown mustard (*Brassica juncea*) and black mustard (*Brassica nigra*).

In all cases, the method proved to be successful and good yields were obtained.

EXAMPLE 11

Crambe (*Crambe abyssinica*), which is closely related to the *Brassica*-genus and is characterized among other things by an oil with high content of erucic acid, and with glucosinolates in the seed of the same kind as those of rapeseed, is a potential oilseed crop which has been received with great interest, primarily in U.S.A. A seed lot from this crop was processed in the pilot plant.

The seeds have a somewhat different appearance, since besides their hulls they are surrounded by the pods. These seeds however could be processed with advantage in plants of the kind described here. Because of higher glucosinolate content in the seed, it is necessary to use a larger number of leaching stages.

In the test, yields were obtained which are given in the following material balance:

and to reach an efficient leaching. Ratios of 1:4 or lower are not advisable because of economical reasons. Of course, a meat-to-water ratio of 1:4 is approximately equivalent to 1:3 when expressed in terms of seed-to-water, this ratio being substantially higher than the maximum seed-to-water ratio of 1:4 disclosed heretofore in the Eapen et al U.S. Pat. No. 3,732,108 granted May 8, 1973. Moreover, as appears in their article in the Journal of The American Oil Chemists' Society, Vol. 46, 1969, at pages 52–55, feasibility studies and experiments by Eapen et al indicated that seed-to-water ratios substantially lower than 1:4 are necessary.

It should be pointed out further that the initial dehulling of the seeds according to the present invention involves essentially more than the "decorticating" step in said Eapen et al patent and in the treatment of crambe seed as disclosed in the Mustakas et al article in Journal of The American Oil Chemists' Society, Vol. 42, October 1965, entitled "Prepress-Solvent Extraction of Crambe: First Commercial Trial Run of New Oil Seed". According to the Eapen et al patent, decortication consists of crushing or otherwise treating the rape seeds in the wet state so that the seed meat is no longer occluded by the seed coat or hull; but the fractured hulls remain mixed with the meat in the subsequent steps of aqueous extraction, drying, flaking, and oil extraction.

Table 6
Material Balance and Analysis Data for Example 11

| Material | Yield kg/h | Moisture % | Oil | Protein | Fiber | Glucosinolate |
|---|---|---|---|---|---|---|
| | | | Weight - % of Dry Matter | | | |
| Seed | 125 | 6.5 | 35.3 | 19.5 | 16.3 | 5.0 |
| ↓ CRUSHING DEHULLING → pods + hulls | 34.8 | 11.5 | 3.2 | 4.2 | 51.2 | 2.6 |
| ↓ fine fraction | 4.0 | 6.5 | 33.3 | 21.7 | 18.5 | 4.6 |
| ↓ PRESSING → oil | — | | 100 | — | — | — |
| ↓ press residue | | | | | | |
| clean meat material | 86.3 | 3.8 | 47.8 | 25.1 | 3.0 | 5.9 |
| ↓ INACTIVATION LEACHING DRYING → leach-water | 213.3 | 91.0 | | | | |
| ↓ EVAPORATION DRYING → dry matter from leach-water | | | | | | |
| leached meat material | 66.5 | 4.5 | 56.7 | 26.3 | 3.8 | 0.02 |
| ↓ PRESSING HEXANE EXTRACTION → oil | 35.6 | — | 100 | — | — | — |
| ↓ concentrate | 30.0 | 8.0 | 0.9 | 40.0 | 8.5 | 0.05 |

Finally, it should be pointed out that the new process, besides yielding a purer protein concentrate (65–67%) in a higher yield than previously possible, involves great economic advantages in that the capacity for a given equipment size will be larger, because only the "interesting" material (meat fraction) is treated in the process stages.

Further, the process is extraordinarily economical regarding the water consumption, since:

1. Only meat material is leached.
2. A high meat-to-water ratio can be used in the leaching.
3. The leaching is effected by a counter-current process.
4. The leach-liquid is also used in the inactivation stage.

In the leaching stage of the new process, the preferred weight ratio of meat-to-water is around 1:3, giving the most economical conditions. Such a high ratio is feasible only because the hulls (seed coats) have initially been detached and separated from the meat material of the seeds in the dry state, so that only the pure meat material is subjected to the myrosinase inactivation, leaching and subsequent steps. In the new process variations in the weight ratio meat-to-water between 1:2.5 and 1:4 may be used. Ratios higher than 1:2.5 are not practicable, because of difficulties to handle the slurry According to the above-mentioned article of Mustakas et al, the crambe seed is decorticated by merely removing the loose outer pericarp (pod) from the whole kernel or seed, leaving the latter with its seed coat (hull) still attached to the meat. The article refers to the pods as "hulls" and hence refers to the decortication as "dehulling". However, this dehulling is not to be confused with the dehulling of the present invention, which includes cracking the dry kernels or seeds after their removal from the pods, thereby loosening the seed coats (hulls) from the meat, and then effecting a complete separation of the seed meat from the seed coats.

We claim:

1. A method of preparing, from seeds selected from Brassica species and Crambe abyssinica, an edible protein concentrate which is non-toxic and has an acceptable light color and a neutral and bland flavor, said seeds consisting of meat and surrounding hulls attached directly to the meat, said method comprising the steps that the dry seeds are cracked to loosen the hulls and thereby form a cracked material which is then separated under essentially dry conditions into a first fraction consisting essentially of meat and a second fraction consisting essentially of non-meat material, the separation being done in two main steps wherein the cracked material is first divided by sifting into three fractions, namely, a coarse fraction comprising hull material and uncompletely cracked seeds, a medium fraction comprising cracked meat material and hull particles, and a fraction of fines, the medium fraction being thereafter freed from the remaining hull particles on a gravity table so as to provide said first fraction, and that only said first fraction is then subjected to the treatment steps of myrosinase inactivation in the wet state at 80°–100° C, removing glucosinolates and other soluble components, mainly carbohydrates, from said first fraction by leaching with water, drying the resulting meat material, subjecting the dried material to solvent extraction to remove the oil, and careful desolventizing of the meat material so that the protein will not be damaged or discolored.

2. The method of claim 1, in which the cracking is effected by passing the seeds between fluted rolls rotating at different speeds in the ratio 1:1.2–4, the slower rotating roll having a speed of 150–500 r.p.m.

3. The method of claim 1, wherein the hulls are separated from the coarse fraction on a gravity table, the uncompletely cracked seeds being subjected to a further cracking and screening, whereafter the recovered medium fraction and fraction of fines are combined with the fractions recovered in the first screening.

4. The method of claim 1, in which said fines are subjected to an expeller pressing operation in order to extract the oil.

5. The method of claim 1, in which the myrosinase inactivation is performed continuously through treatment with hot water at 80–100° C for a holding time of 1.5–20 minutes.

6. The method of claim 5, in which the hot water comprises leach-liquid from the leaching step.

7. The method of claim 1, in which the leaching step is performed according to the counter-current principle in repeated stages, each stage consisting of a holding zone where the material is stirred and treated with leach-liquid, and a sieving zone where the leached material is separated by centrifugal straining from the leach-liquid.

8. The method of claim 7, in which the leaching is performed at a temperature of 60°–80° C.

9. The method of claim 7, in which the leaching is carried out in a time period of 15–90 minutes per stage.

10. The method of claim 7, in which the pH of the leach-liquid is kept between 3 and 8.

11. The method of claim 7, in which the weight ratio of meat material to leach-water is between 1:2.5 and 1:4.0.

12. The method of claim 11, in which said weight ratio is about 1:3.

13. The method of claim 7, in which the leaching is carried out in 2 to 8 stages.

14. The method of claim 7, in which pure leach-water is added to the last leaching stage and is reused in the leaching stage next preceding said last stage, the spent leach-liquid after its use in the first leaching stage being evaporated until a dry matter content of 25–60% by weight is attained, said moisture content being then reduced to about 10% by weight by drying of the evaporated liquid.

15. The method of claim 1, in which said drying of the leached material is effected with hot air in a fluidizied-bed drying zone where the temperature is maintained at 50°–70° C and where the material is dried to a moisture content of 3–7% by weight.

16. The method of claim 1, in which the desolventizing of the protein concentrate is effected with superheated solvent vapor to avoid discoloring and protein destruction.

* * * * *

UNITED STATES PATENT OFFICE
CERTIFICATE OF CORRECTION

PATENT NO. : 4,083,836
DATED : April 11, 1978
INVENTOR(S) : Klas Orvar Stensson Anjou, Aurel Jeny Fecske, Carl Goran Krook and Jan Sven Ragnar Ohlson It is certified that error appears in the above-identified patent and that said Letters Patent are hereby corrected as shown below:

Col. 3, line 5, "procesing" should be --processing--.

Col. 3, line 32, "cLasification" should be --classification--.

Col. 4, line 11, "is" should be --in--.

Col. 7, line 6, "plane" should be --plant--.

Col. 7, line 8, "proceeded" should be --processed--.

Col. 7, line 28, second occurrence of "sifter" should be --added--; "shifter" should be --sifter--.

Col. 7, before the table, the following paragraph should be inserted:

--The following yields were obtained from the dehulling process.--

Col. 8, line 50, "cursher" should be --crusher--.

Col. 8, line 60, the semicolon (";") should be omitted.

Signed and Sealed this

Fifth Day of June 1979

[SEAL]

Attest:

RUTH C. MASON
Attesting Officer

DONALD W. BANNER
Commissioner of Patents and Trademarks